(12) United States Patent
Foster et al.

(10) Patent No.: US 10,641,281 B2
(45) Date of Patent: May 5, 2020

(54) MISTUNED LAMINATE AIRFOIL

(71) Applicant: United Technologies Corporation, Farmington, CT (US)

(72) Inventors: Larry Foster, South Glastonbury, CT (US); Myron L. Klein, Higganum, CT (US)

(73) Assignee: United Technologies Corporation, Farmington, CT (US)

( * ) Notice: Subject to any disclaimer, the term of this patent is extended or adjusted under 35 U.S.C. 154(b) by 656 days.

(21) Appl. No.: 15/231,058

(22) Filed: Aug. 8, 2016

(65) Prior Publication Data

US 2018/0038382 A1    Feb. 8, 2018

(51) Int. Cl.
| | | |
|---|---|---|
| *F04D 29/32* | (2006.01) | |
| *F01D 5/28* | (2006.01) | |
| *F04D 29/66* | (2006.01) | |
| *F01D 5/10* | (2006.01) | |
| *F01D 5/16* | (2006.01) | |

(Continued)

(52) U.S. Cl.
CPC ............. *F04D 29/327* (2013.01); *F01D 5/10* (2013.01); *F01D 5/16* (2013.01); *F01D 5/282* (2013.01); *F01D 25/04* (2013.01); *F02C 3/04* (2013.01); *F02K 3/06* (2013.01); *F04D 29/023* (2013.01); *F04D 29/388* (2013.01); *F04D 29/666* (2013.01); *F05D 2220/36* (2013.01); *F05D 2230/60* (2013.01); *F05D 2240/35* (2013.01); *F05D 2260/961* (2013.01); *F05D 2300/603* (2013.01); *F05D 2300/6034* (2013.01); *Y02T 50/673* (2013.01)

(58) Field of Classification Search
CPC .... F04D 29/327; F04D 29/023; F04D 29/388; F04D 29/666; F04D 29/668; F01D 5/10; F01D 5/26; F01D 5/141; F01D 5/16; F01D 5/282; F01D 25/04; F02C 3/04; F02K 3/06; F05D 2220/36; F05D 2240/35; F05D 2260/961; F05D 2300/603; F05D 2300/6034; Y02T 50/673
USPC .......................................................... 60/805
See application file for complete search history.

(56) References Cited

U.S. PATENT DOCUMENTS

| | | |
|---|---|---|
| 3,368,795 A | 2/1968 | Bolin et al. |
| 4,097,192 A | 6/1978 | Kulina |

(Continued)

FOREIGN PATENT DOCUMENTS

| | | | |
|---|---|---|---|
| EP | 2617946 A2 * | 7/2013 | ............... F01D 5/26 |
| GB | 2490127 | 10/2012 | |

OTHER PUBLICATIONS

Machine translation of EP2617946A2 (Year: 2019).*
European Search Report for Application No. 17185373.2 dated Dec. 19, 2017.

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A gas turbine engine includes a fan mounting a first group of blades and a second group of blades. The first group of blades and the second group of blades share a profile shape. The first group of blades have a first laminate composition, and the second group of blades have a second laminate composition, distinct from the first laminate composition. A frequency of a vibratory mode of the first group of blades is offset from a frequency of a vibratory mode of the second group of blades.

20 Claims, 4 Drawing Sheets

(51) Int. Cl.

*F01D 25/04* (2006.01)
*F02C 3/04* (2006.01)
*F02K 3/06* (2006.01)
*F04D 29/02* (2006.01)
*F04D 29/38* (2006.01)

(56) References Cited

U.S. PATENT DOCUMENTS

| | | |
|---|---|---|
| 4,098,559 A | 7/1978 | Price |
| 4,178,667 A | 12/1979 | Stevens et al. |
| 4,966,527 A | 10/1990 | Merz |
| 5,160,242 A | 11/1992 | Brown |
| 5,181,678 A | 1/1993 | Widnall et al. |
| 5,269,657 A | 12/1993 | Garfinkle |
| 5,490,764 A | 2/1996 | Schilling |
| 5,993,161 A | 11/1999 | Shapiro |
| 6,190,133 B1 | 2/2001 | Ress, Jr. et al. |
| 6,379,112 B1 | 4/2002 | Montgomery |
| 6,428,278 B1 | 8/2002 | Montgomery et al. |
| 6,471,482 B2 | 10/2002 | Montgomery et al. |
| H2057 H * | 1/2003 | Veers .................. 416/230 |
| 2006/0029501 A1 | 2/2006 | Burdgick et al. |
| 2007/036658 A1 | 2/2007 | Morris |
| 2010/0266415 A1 * | 10/2010 | Viens .................. F01D 5/147 |
| | | 416/226 |
| 2015/0322803 A1 | 11/2015 | Fulayter et al. |
| 2016/0053617 A1 | 2/2016 | Grelotti et al. |

\* cited by examiner

MISTUNED LAMINATE AIRFOIL

TECHNICAL FIELD

The present disclosure relates generally to airfoils for a gas powered turbine, and more specifically to mistuned airfoils.

BACKGROUND

Gas powered turbines generally include a compressor section that draws in and compresses air, a combustor section where the compressed air is mixed with a fuel and ignited, and a turbine section across which the resultant combustion products are expanded. The expansion of the combustion products drives the turbine to rotate, which in turn drives the compressor.

Within each of the compressor section and turbine section are multiple flowpath spanning rotor blades. Such blades typically include one or more airfoil shaped profiles, and are designed to interact with the flow of fluid through the primary fluid flowpath of the gas turbine engine either by being turned by the fluid flow, in the case of turbine blades, or by driving the fluid flow, in the case of compressor blades.

One impact of using airfoil shaped blades is that each blade has vibratory modes that can cause flutter and flow shedding, which can negatively impact the performance of the blade due to the resultant non-integral vibrations.

SUMMARY OF THE INVENTION

In one exemplary embodiment a fan for a gas turbine engine includes a fan mounting a first group of blades and a second group of blades, the first group of blades and the second group of blades sharing a profile shape, wherein the first group of blades have a first laminate composition, wherein the second group of blades have a second laminate composition, distinct from the first laminate composition, and wherein a frequency of a vibratory mode of the first group of blades is offset from a frequency of a vibratory mode of the second group of blades.

In another example of the above described fan for a gas turbine engine the first group of blades and the second group of blades are alternately arranged circumferentially around the fan.

In another example of any of the above described fans for a gas turbine engine each blade in the first group of blades is circumferentially adjacent a first blade of the second group of blades and a second blade of the second group of blades.

In another example of any of the above described fans for a gas turbine engine the frequency of the vibratory mode of the first group of blades is offset from the frequency of the vibratory mode of the second group of blades by at least 4%.

In another example of any of the above described fans for a gas turbine engine the frequency of the vibratory mode of the first group of blades is offset from the frequency of the vibratory mode of the second group of blades by at least 6%.

In another example of any of the above described fans for a gas turbine engine the first laminate composition is a first layup configuration, and wherein the second laminate composition is a second layup configuration distinct from the first layup configuration.

In another example of any of the above described fans for a gas turbine engine the first layup configuration includes at least one of a specific material layer orientation and a relative layer position, and wherein the second layup configuration includes at least one of a specific material layer orientation and a relative layer position.

In another example of any of the above described fans for a gas turbine engine the material layer orientation of the first layup configuration is distinct from the material layer orientation of the second layup configuration.

In another example of any of the above described fans for a gas turbine engine the relative layer position of the first layup configuration is distinct from the relative layer position of the second layup configuration.

In another example of any of the above described fans for a gas turbine engine each blade of the first group of blades, and each blade of the second group of blades is constructed at least partially of a polymer matrix composite.

In one exemplary embodiment a gas turbine engine includes a compressor section, a combustor fluidly connected to the compressor section, a turbine section fluidly connected to the combustor, a fan drivably connected to the turbine section, the fan including a first set of blades and a second set of blades, wherein each of the first set of blades and the second set of blades share a profile, the first set of blades having a first vibratory mode, and the second set of blades having a second vibratory mode distinct form the first vibratory mode.

In another example of the above described gas turbine engine the blades in the first set of blades are laminate blades having a first laminate composition and the blades in the second set of blades are laminate blades having a second laminate composition distinct from the first laminate composition.

In another example of any of the above described gas turbine engines the first laminate composition is a first layup configuration, and wherein the second laminate composition is a second layup configuration distinct from the first layup configuration.

In another example of any of the above described gas turbine engines the first layup configuration includes at least one of a specific material layer orientation and a relative layer position, and wherein the second layup configuration includes at least one of a specific material layer orientation and a relative layer position.

In another example of any of the above described gas turbine engines the material layer orientation of the first layup configuration is distinct from the material layer orientation of the second layup configuration.

In another example of any of the above described gas turbine engines the relative layer position of the first layup configuration is distinct from the relative layer position of the second layup configuration.

In another example of any of the above described gas turbine engines the first set of blades and the second set of blades are arranged in a circumferentially alternating configuration.

In another example of any of the above described gas turbine engines a vibratory mode of the first set of blades is offset from a vibratory mode of the second set of blades by at least 4%.

An exemplary method for creating a gas turbine engine fan includes installing a first set of blades and a second set of blades in circumferentially alternating positions about a rim, wherein set first set of blades and the second set of blades share a profile and have distinct vibratory modes.

In a further example of the above described exemplary method for creating a gas turbine engine fan installing the first set of blades and the second set of blades comprises matching a keying feature with at least one of the first set of blades and the second set of blades with corresponding slots in the rim.

These and other features of the present invention can be best understood from the following specification and drawings, the following of which is a brief description.

DETAILED DESCRIPTION OF AN EMBODIMENT

Figure 1:
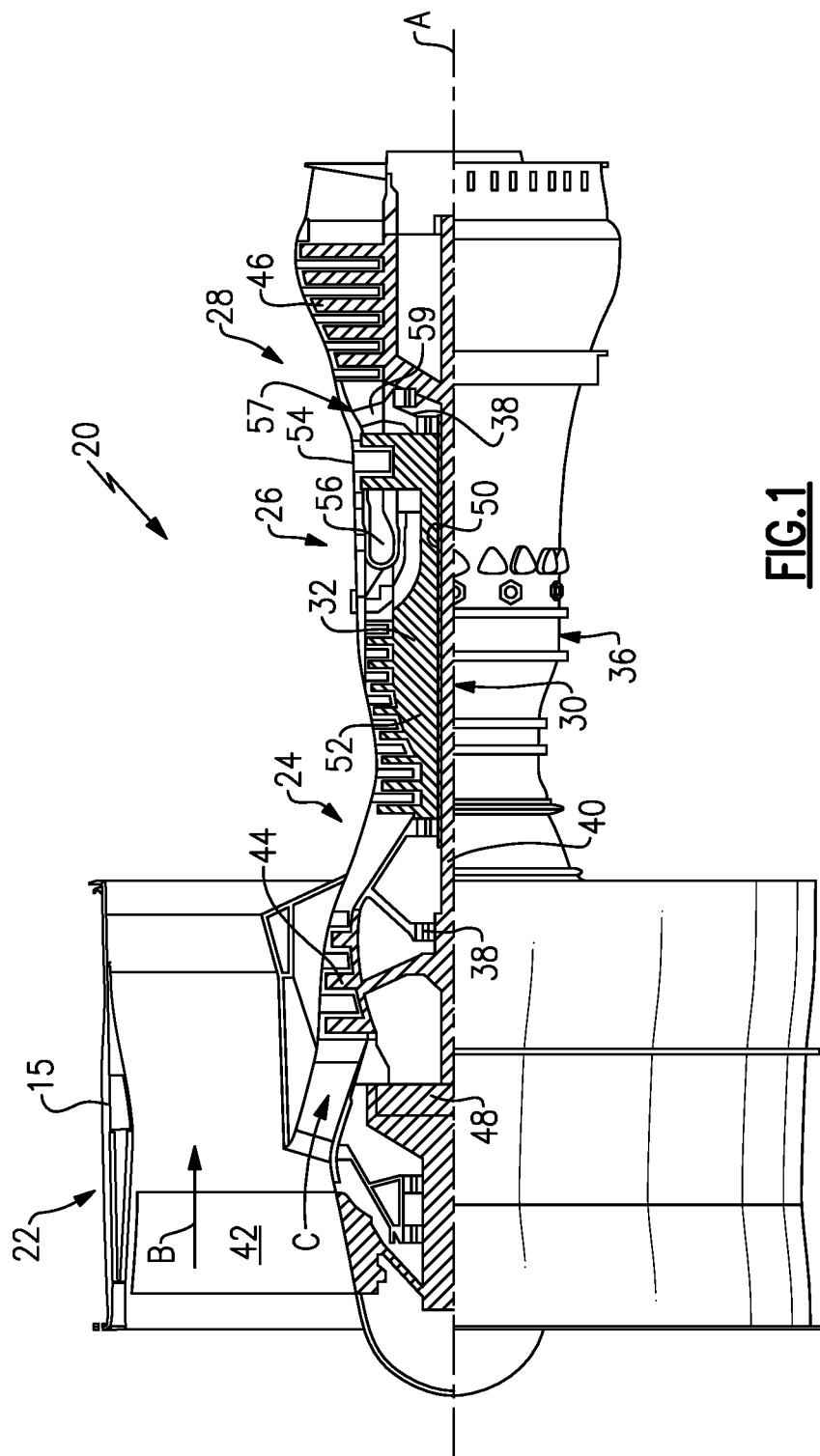
FIG. 1 schematically illustrates an exemplary gas powered turbine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

While described herein in the context of an exemplary gas turbine engine, one of skill in the art, having the benefit of the following disclosure, will understand that the gaspath component, and associated cooling system, described herein can be utilized in any gas powered turbine, including a land based turbine, a marine turbine, a test rig, or any other gas powered turbine construction.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/s).

One goal of gas turbine engine design, and specifically rotor and fan blade design, is to minimize non-integral vibrations caused by flutter and flow shedding. Tuning (intentionally designing the vibratory frequencies) of the gas turbine engine fan has been shown to reduce non-integral vibrations in the gas turbine engine.

One method of tuning the gas turbine engine fan involves varying the natural frequencies of individual fan blades. This variation is referred to herein as "mistuning the blades." A typical mistuned fan blade assembly includes alternating types of blades, with blades from a first blade set, and blades from a second blade set being arranged in a single rotor. The blades from the first blade set are designed with a first vibratory mode, and the blades in a second blade set are designed with a second vibratory mode, distinct from the first vibratory mode.

One approach to achieve this variation is by removing material from the blade edges. This method is commonly referred to as "clipping." Removing material from the blade edges changes the natural frequency of the blade, and, in so doing, may reduce the non-integral vibrations in the fan. This method typically involves modifying the blade edges after the blade is manufactured.

Another method of tuning the gas turbine engine fan involves having fan blades with different thicknesses on the same rotor. Typically, this method uses fan blades on the rotor alternating between blades of different external profiles. Thus, both "thick" and "thin" blades are used and both "thick" and "thin" blades are manufactured.

Both of these approaches, "clipping" and "thick—thin," have undesirable aerodynamic consequences as a result of the blades in each set having distinct aerodynamic profiles from the blades in the other set.

Figure 2:
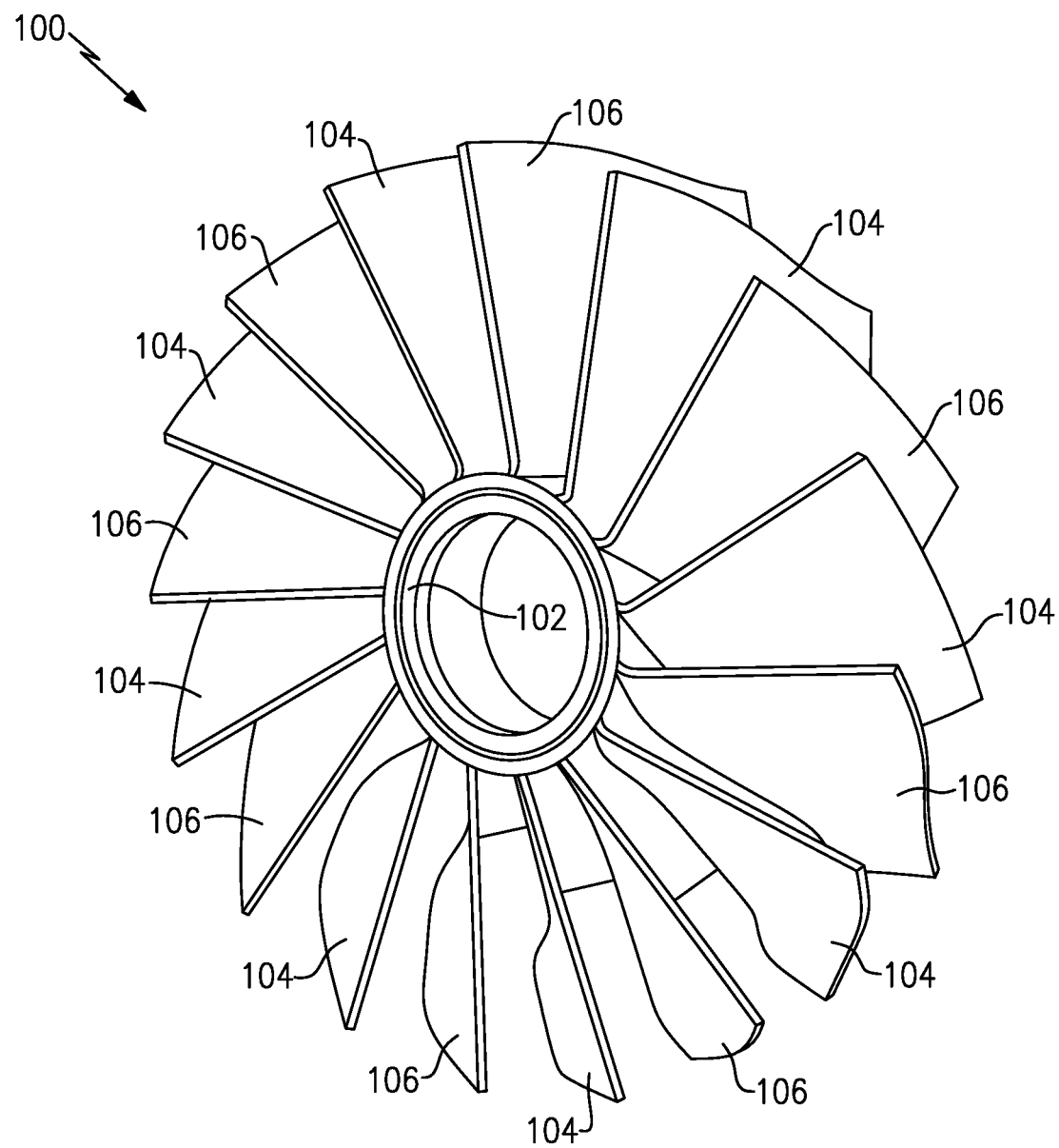
FIG. 2 schematically illustrates a fan section of a gas turbine engine.

With continued reference to FIG. 1, FIG. 2 schematically illustrates a fan 100 for a fan section of a gas turbine engine, such as the engine 20 of FIG. 1. The fan 100 includes a rim 102, and multiple fan blades 104, 106 protruding radially outward from the rim 102. The fan blades 104, 106 are divided into a first set of fan blades 104, and a second set of fan blades 106. The fan blades 104, 106 are arranged circumferentially with alternating blades form each set. In other words, each blade 104 in the first set is circumferentially adjacent to two blades 106 in the second set.

All of the fan blades 104, 106 in the fan 100 have identical blade profiles. In some examples, the fan blades 104, 106 include identical geometries for the entire blade 104, 106. In alternative examples the fan blades 104, 106 include identical blade geometries, with one or more distinctions in a root geometry connecting the blade 104, 106 to the rim 102. By way of example, the distinctions in the root geometry can be a keying feature configured to prevent incorrect installation of a blade 104 from the first set of blades 104 in a slot designated for a blade 106 in the second set of blades 106, and vice versa.

Each of the blades 104, 106 is constructed of a laminated composite, such as a polymer matrix composite (PMC). As is understood in the art, PMC's, as well as other laminated composites, are constructed of multiple laminated layers. The orientations and the relative positions of the layers affect the structural qualities of the object being constructed. By way of example, altering the direction (orientation) of the layers or the positions of the layers relative to each other will alter the strength and stiffness of the blade, without altering the completed geometry of the blade 104, 106. The specific construction, relative position of, and orientation of, the multiple layers in the laminate is referred to as the "layup" of the laminate construction.

As a further effect of utilizing distinct laminate compositions between the blades 104, 106 the vibratory modes of the blades 104, 106 are distinct. The resultant vibratory modes of the laminate composition of any given blade 104, 106 can be determined empirically or theoretically according to known methods in the art, with the specific vibratory modes depending on the geometry of the blade 104, 106 and the laminate composition.

In the example of FIG. 2, the first set of blades 104 is designed with a first vibratory mode, and the second set of blades 106 is designed with a second vibratory mode. In some examples, the first and second set of blades 104, 106 have vibratory modes where the frequencies are offset by at least 4%, and the laminate compositions are chosen accordingly. In further examples, the blades 104, 106 are designed with vibratory modes where the frequencies are offset by at least 6%. By intentionally creating an offset of 6% or more, the variability due to manufacturing issues, and tolerances, can be accounted for and the frequencies of the vibratory modes are ensured to be offset by at least 4% in a final production. The magnitude of the offset required to account for the above described variability depends on the specific engine parameter, manufacturing parameters, and the like, and can be determined by one of skill in the art having the benefit of this disclosure.

Figure 3:
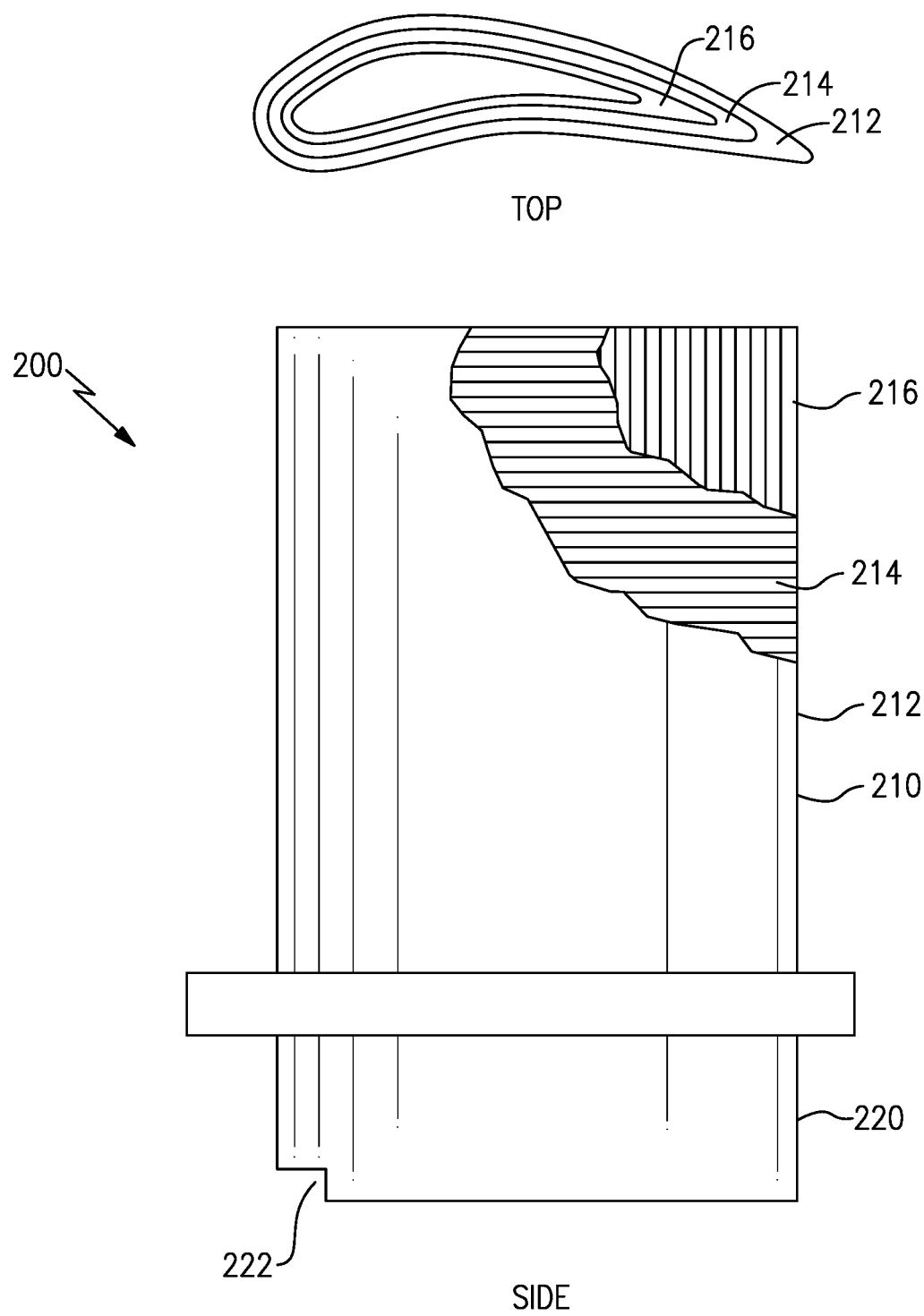
FIG. 3 schematically illustrates a top view and a side view of a first set of blades within the fan of FIG. 2.
Figure 4:
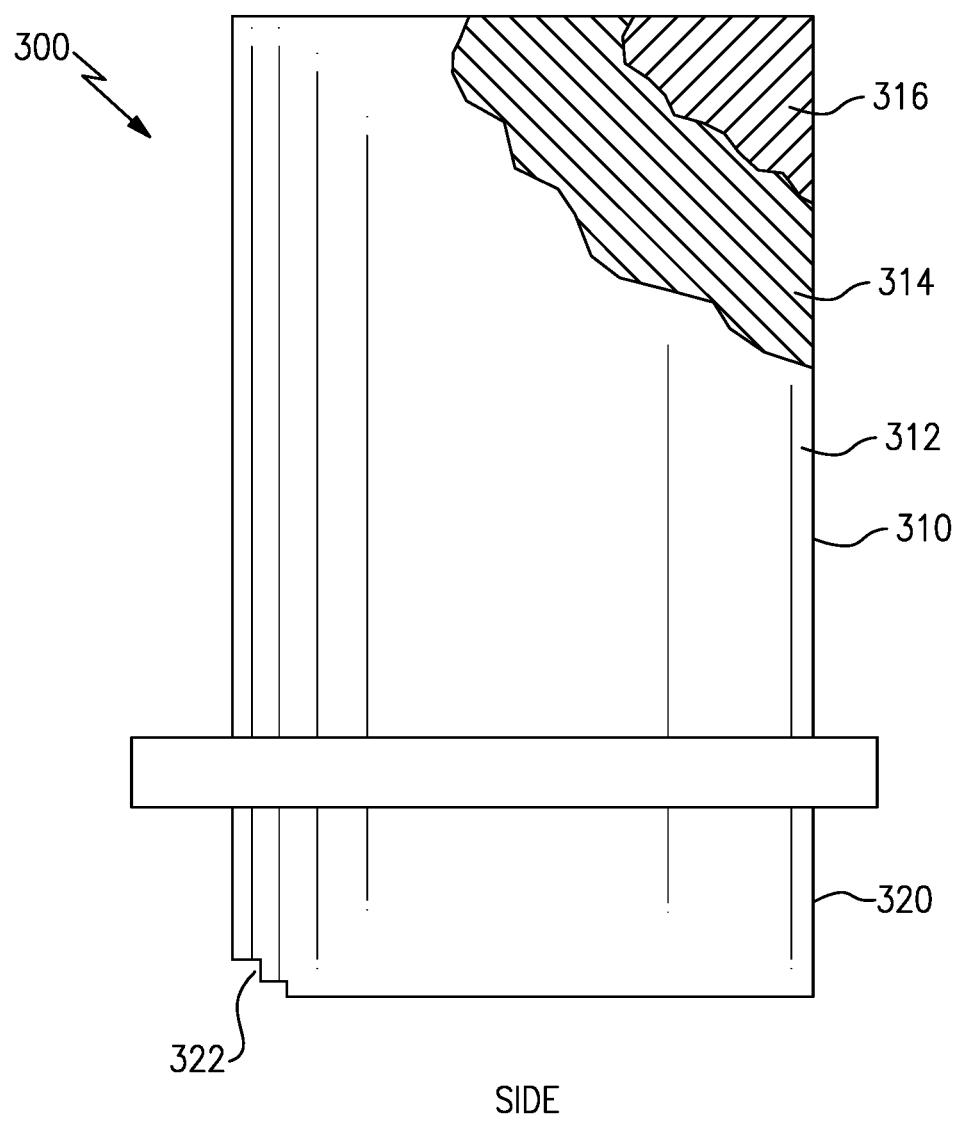
FIG. 4 schematically illustrates a top view and a side view of a second set of blades within the fan of FIG. 2.

With continued reference to FIGS. 1 and 2, FIG. 3 schematically illustrates a top view and a side view of an exemplary blade 200 that can be used as a blade 104, 106 in the example fan 100 of FIG. 2. The thickness and orientation of the layers illustrated in the example of FIG. 3 are exaggerated for explanatory effect, and one of skill in the art having the benefit of this disclosure will recognize that alternative orientations and thicknesses can be utilized to achieve similar results. Similarly, FIG. 4 schematically illustrates a top view and a side view of an exemplary blade 300 that can be used as a blade 104, 106 in the example fan 100 of FIG. 2.

Each of the blades 200, 300 includes a blade portion 210, 310 protruding radially outward from a root 220, 320. The root 220, 320 interfaces with, and connects the blade 200, 300 to the rim 102 (shown in FIG. 2). Each blade portion 210, 310 is constructed of multiple layers 212, 214, 216, 312, 314, 316. While illustrated as including three layers 212, 214, 216, 312, 314, 316, one of skill in the art, having the benefit of this disclosure, will understand that each blade 200, 300 will be constructed of substantially more layers than the three illustrated layers 212, 214, 216, 312, 314, 316.

In this example, each layer is made from unidirectional tape material, illustrated as parallel lines, with the orientation of the tape layers affecting the material properties of the blade portion 210, 310. As can be seen, the internal tape layers 214, 216 of the blade 200 of FIG. 3 have a first orientation, whereas the internal tape layers 314, 316 of the blade 300 of FIG. 4 have a second orientation, distinct from the first orientation. Further differentiating the layup of the blades 200, 300 in some examples is the spacing between the layers, the layer material, and/or the positioning of similarly aligned layers within a single blade 200, 300. In such examples, the thickness of corresponding layers and the relative position of corresponding layers within the structure (e.g. the innermost layer vs. the outermost layer), are varied giving rise to distinct vibratory mode frequencies.

In some examples, the blades 200, 300 include distinct keying features 222, 322 within the root 220, 320. The keying feature 222, 322 ensures that any given blade 200, 300 can only be inserted in a slot for that particular blade set, thereby minimizing manufacturing and maintenance errors and complexity.

In some examples, the root 220, 320 is constructed of the same laminate as the blade portion 210, 310, and the entire blade 200, 300 structure is a single integral structure. In alternative examples, the root 220, 320 can be a distinct structure that the blade portion 210, 310 is built onto. In such examples, the layup variation between the first set of blades 200 and the second set of blades 300 applies only to the blade portion 210, 310, and the roots 220, 320 can have the same structure.

While illustrated in FIGS. 3 and 4 as including no internal features for simplicity, one of skill in the art will understand that in some examples the blades 200, 300 can include internal cavities, or other internal structures according to known designs without impacting the layup based mistuning described herein.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan for a gas turbine engine comprising:
    the fan mounting a first group of blades and a second group of blades;
    said first group of blades and said second group of blades sharing a profile shape;
    wherein said first group of blades have a first laminate composition;
    wherein said second group of blades have a second laminate composition, distinct from the first laminate composition, and said first group of blades and said second group of blades each include a corresponding root shape distinct from the corresponding root shape of the other of said first group of blades and said second group of blades, wherein each of the corresponding root shapes has a same layup structure as each other of the corresponding root shapes; and
    wherein a frequency of a vibratory mode of the first group of blades is offset from a frequency of a vibratory mode of the second group of blades.

2. The fan of claim 1, wherein said first group of blades and said second group of blades are alternately arranged circumferentially around said fan.

3. The fan of claim 2, wherein each blade in said first group of blades is circumferentially adjacent a first blade of said second group of blades and a second blade of said second group of blades.

4. The fan of claim 1, wherein the frequency of the vibratory mode of the first group of blades is offset from the frequency of the vibratory mode of the second group of blades by at least 4%.

5. The fan of claim 4, wherein the frequency of the vibratory mode of the first group of blades is offset from the frequency of the vibratory mode of the second group of blades by at least 6%.

6. The fan of claim 1, wherein the first laminate composition is a first layup configuration, and wherein the second laminate composition is a second layup configuration distinct from the first layup configuration.

7. The fan of claim 6, wherein the first layup configuration includes at least one of a specific material layer orientation and a relative layer position, and wherein the second layup configuration includes at least one of a specific material layer orientation and a relative layer position.

8. The fan of claim 7, wherein the material layer orientation of the first layup configuration is distinct from the material layer orientation of the second layup configuration.

9. The fan of claim 7, wherein the relative layer position of the first layup configuration is distinct from the relative layer position of the second layup configuration.

10. The fan of claim 1, wherein each blade of said first group of blades, and each blade of said second group of blades is constructed at least partially of a polymer matrix composite.

11. The fan of claim 1, wherein the distinct root shapes of one of said first group of blades and said second group of blades includes a keying feature.

12. The fan of claim 1, wherein each blade structure is a single integral structure including a corresponding blade root.

13. A gas turbine engine comprising:
    a compressor section;
    a combustor fluidly connected to the compressor section;
    a turbine section fluidly connected to the combustor;
    a fan drivably connected to said turbine section, the fan including a first set of blades and a second set of blades, wherein each of said first set of blades and said second set of blades share a profile;
    the first set of blades having a first vibratory mode; and
    the second set of blades having a second vibratory mode distinct from the first vibratory mode; and
    wherein said first set of blades and said second set of blades each include a corresponding root shape distinct from the corresponding root shape of the other of said first set of blades and said second set of blades, and each of the corresponding root shapes has a same layup structure as each other of the corresponding root shapes.

14. The gas turbine engine of claim 13, wherein the blades in the first set of blades are laminate blades having a first laminate composition and the blades in the second set of blades are laminate blades having a second laminate composition distinct from the first laminate composition.

15. The gas turbine engine of claim 14, wherein the first laminate composition is a first layup configuration, and wherein the second laminate composition is a second layup configuration distinct from the first layup configuration.

16. The gas turbine engine of claim 15, wherein the first layup configuration includes at least one of a specific material layer orientation and a relative layer position, and wherein the second layup configuration includes at least one of a specific material layer orientation and a relative layer position.

17. The gas turbine engine of claim 16, wherein the material layer orientation of the first layup configuration is distinct from the material layer orientation of the second layup configuration.

18. The gas turbine engine of claim 16, wherein the relative layer position of the first layup configuration is distinct from the relative layer position of the second layup configuration.

19. The gas turbine engine of claim 14, wherein said first set of blades and said second set of blades are arranged in a circumferentially alternating configuration.

20. The gas turbine engine of claim 14, wherein a vibratory mode of the first set of blades is offset from a vibratory mode of the second set of blades by at least 4%.

* * * * *